(12) United States Patent
Kahn

(10) Patent No.: US 7,945,242 B2
(45) Date of Patent: May 17, 2011

(54) AUTOMATIC DISCONNECT IN RINGING STATE OF CALL FROM USER WITH NO CREDIT

(75) Inventor: Ari Kahn, Johannesburg (ZA)

(73) Assignee: Ari Kahn, Mount Shasta, CA (US)

( * ) Notice: Subject to any disclaimer, the term of this patent is extended or adjusted under 35 U.S.C. 154(b) by 263 days.

(21) Appl. No.: 10/558,644

(22) PCT Filed: May 26, 2004

(86) PCT No.: PCT/IB2004/001718
§ 371 (c)(1),
(2), (4) Date: Oct. 18, 2006

(87) PCT Pub. No.: WO2004/107795
PCT Pub. Date: Dec. 9, 2004

(65) Prior Publication Data
US 2007/0091869 A1     Apr. 26, 2007

(30) Foreign Application Priority Data

May 30, 2003  (ZA) .................................. 2003/4248

(51) Int. Cl.
*H04M 11/00*     (2006.01)
(52) U.S. Cl. ..................... 455/407; 379/114.21
(58) Field of Classification Search ............... 455/414.1, 455/555, 417, 435.1, 435.2, 407–409; 379/207.02, 379/210.01, 229, 114.01–114.04; 370/352
See application file for complete search history.

(56) References Cited

U.S. PATENT DOCUMENTS
6,249,674 B1    6/2001   Verdonk
(Continued)

FOREIGN PATENT DOCUMENTS
WO       WO 98/53637        11/1998
(Continued)

OTHER PUBLICATIONS

Yi-Bing Lin, Ming-Feng Chang, Mobile Prepaid Phone Services, Jun. 2000, IEEE Personal Coomunications.*
(Continued)

*Primary Examiner* — Kamran Afshar
*Assistant Examiner* — Vladimir Magloire
(74) *Attorney, Agent, or Firm* — Reed Smith LLP; Craig P. Opperman; Linda Lee

(57) ABSTRACT

A method and system for operating a telephony service are disclosed. A telephone network is provided, which may be a physical network or a virtual network hosted by an existing network. Network identifies defined by SIM cards, or telephones with built-in SIM cards, are issued to network users. The SIM cards defines a network identity including a unique network telephone number. The network, which is preferably an intelligent network (IN) is configured to permit telephones of the users to receive calls and/or messages, irrespective of the status of a user's account with the network. In addition, the network is configured to permit users without credit or airtime to make an outgoing call to an intended call recipient, the call being disconnected after a predetermined number of rings. This is sufficient to create a missed call notification on a mobile telephone of the intended call recipient. The network is configured to generate a notification such as a text message or recorded announcement to the intended recipient if he/she is not available at the time of the call.

17 Claims, 1 Drawing Sheet

U.S. PATENT DOCUMENTS

| | | | |
|---|---|---|---|
| 6,353,730 B1* | 3/2002 | Buettner et al. | 340/7.1 |
| 6,463,139 B1 | 10/2002 | Davitt et al. | |
| 6,643,505 B1* | 11/2003 | Kamperschroer | 455/414.1 |
| 6,728,349 B2 | 4/2004 | Chang et al. | |
| 6,961,559 B1* | 11/2005 | Chow et al. | 455/414.1 |
| 7,003,306 B2* | 2/2006 | Henry-Labordere | 455/466 |
| 2002/0183040 A1* | 12/2002 | Lundstrom et al. | 455/406 |
| 2003/0012143 A1* | 1/2003 | Chen et al. | 370/252 |
| 2003/0231753 A1 | 12/2003 | Casaccia | |
| 2004/0029561 A1* | 2/2004 | Holter et al. | 455/405 |
| 2004/0058667 A1 | 3/2004 | Pienmaki et al. | |
| 2004/0132449 A1 | 7/2004 | Kowarsch | |
| 2004/0162058 A1* | 8/2004 | Mottes | 455/411 |

FOREIGN PATENT DOCUMENTS

| | | |
|---|---|---|
| WO | WO 02/13496 A2 | 2/2002 |

OTHER PUBLICATIONS

International Preliminary Report on Patentability for PCT/IB2004/001718.

Written Opinion of the International Searching Authority for PCT/IB2004/001718.

International Search Report for PCT/IB2004/001718 mailed date Sep. 7, 2004.

Office Action dated Mar. 26, 2010 in U.S. Appl. No. 10/556,037 (Kahn, Ari).

U.S. Appl. No. 10/556,037 Non-Final Office Action, dated Mar. 26, 2010.

U.S. Appl. No. 10/556,037 Reply Pursuant to 37 CFR Section 1.111, dated Sep. 24, 210.

* cited by examiner

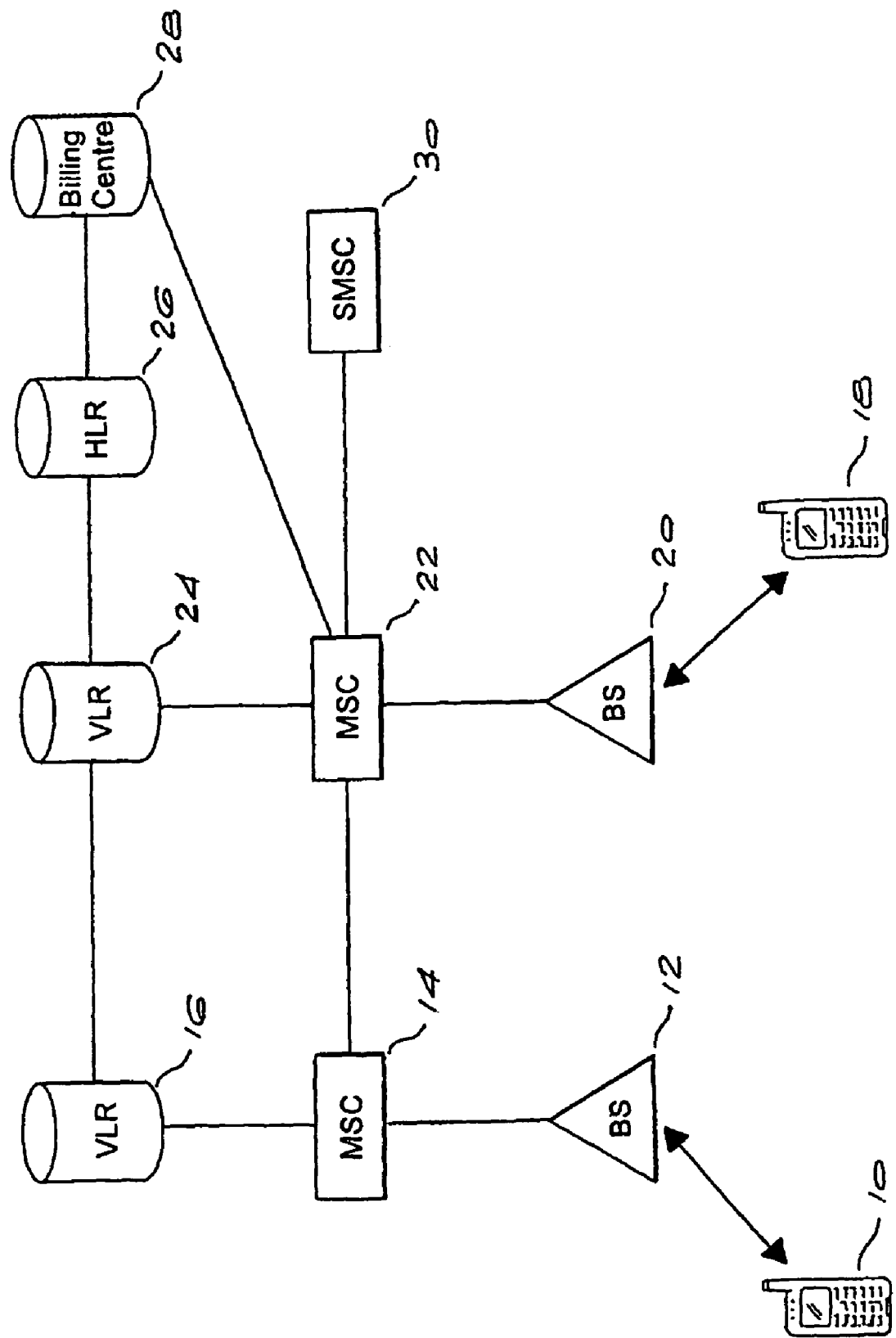

AUTOMATIC DISCONNECT IN RINGING STATE OF CALL FROM USER WITH NO CREDIT

BACKGROUND OF THE INVENTION

THIS invention relates to a method of operating a telephony service and to a telephony network configured to implement the method.

Various factors limit the access of the sectors of the population to telephony services. In South Africa, for example, a substantial portion of the population cannot afford the cost of a telephone service and the cost of calls.

It is an object of the invention to provide a method and system which can address this situation.

SUMMARY OF THE INVENTION

According to the invention there is provided a method of operating a telephony service, the method comprising:

allocating a network identity comprising a unique network telephone number to each of a plurality of network users; and configuring the network to permit each network user to receive calls and/or messages from callers calling a respective network telephone number of the network user, and to give network access to said network user for outgoing calls, irrespective of the status of an account of said network user, so that such a network user may receive calls and/or messages without having prepaid airtime or a credit account in good standing, outgoing calls made from a telephone of a network user without credit or airtime being disconnected after a predetermined number of rings, thereby creating a missed call notification for the intended call recipient.

The method may include providing each user with a mobile telephone in which the network identity can be used.

The mobile telephones may be locked to a telephony network associated with the unique network number.

The mobile telephones may also be locked to a subscriber identity module defining the network identity.

Alternatively, the mobile telephones may have a built-in subscriber identity module defining the network identity.

The mobile telephones may be provided free of charge, or at a nominal charge, to the network users.

The network is preferably configured to cause outgoing calls made from a telephone of a network user without credit or airtime to be disconnected after one ring.

The network may be configured to generate a notification to the intended call recipient of an attempted call from a network user if the call recipient's telephone is off, engaged or out of coverage.

For example, the notification may be a text message or a recorded announcement.

The network identity allocated to each network user may be allocated on a virtual network hosted at least partially by an existing network, the virtual network having a network prefix distinct from that of existing networks.

Further according to the invention there is provided a system for providing telephony access to a plurality of network users, the system comprising:

a telephony network; and a plurality of network identities issued to respective users of the telephony network, each network identity defining a unique network telephone number and being usable in at least one telephone, the network being configured to permit telephones of the users to receive calls and/or messages from callers calling respective network telephone numbers of the users, and to give network access to said network user for outgoing calls, irrespective of the status of accounts of the users, so that users may receive calls and/or messages without having prepaid airtime or a credit account in good standing, outgoing calls made from a telephone of a network user without credit or airtime being disconnected after a predetermined number of rings, thereby creating a missed call notification for the intended call recipient.

The telephony network may be configured to define voice and/or message mailboxes for each user, thereby to store voicemail and/or text messages from callers to the respective users.

The telephony network may be a virtual mobile telephony network hosted at least partially by an existing mobile telephony network and having a unique network identifier code.

The network identities are preferably defined by subscriber identity modules (SIMs) issued to the users, the subscriber identity modules each being usable in a telephone of a user.

Each subscriber identity module may be built into a respective telephone.

Alternatively, each subscriber identity module may be a miniature SIM usable in a mobile telephone and be locked to a particular mobile telephone.

Further alternatively, each subscriber identity module may be a credit card sized SIM usable in public telephones and/or other telephone terminals.

BRIEF DESCRIPTION OF THE DRAWING

The single drawing is a simplified diagrammatic illustration of a telephony network which can be configured to implement the method and system of the invention.

DESCRIPTION OF AN EMBODIMENT

The present invention is premised on the idea that offering free telephones and access to a telephony network, although seemingly unprofitable on the face of it, can in fact lead to increased revenue for a network operator implementing such a method and system.

The invention proposes that free or low cost mobile telephones be provided which are network-locked to a new network. Each mobile telephone is provided with a subscriber identity module (SIM card) which is locked to the respective telephone, so that each telephone effectively is usable only on the new network and with the SIM card provided. The telephone may have a built-in SIM card, for example, as opposed to conventional removable SIM cards. The SIM card determines a network telephone number for the telephone which is unique.

The mobile telephones are offered to prospective users free of charge or at a nominal charge (below cost), and the mobile telephones are preferably basic, low cost "entry level" units.

The new network is preferably a virtual mobile network hosted by an existing mobile telephony network. As usage of the virtual network expands beyond the capacity of the existing network to support it, additional network infrastructure to support the new network can be provided. However, the new network could also have new network infrastructure of its own, at least in part.

The virtual network preferably has a network prefix distinct from that of existing networks. However, as it is based on an existing mobile network, it can have the functionality of that network. For maximum functionality, the host network should be an intelligent network (IN).

The host network is configured to permit the mobile telephones which are issued to receive calls, and is also configured to provide a voice mailbox and/or message mailbox for each network user, able to receive and store voicemail and/or text messages which can be accessed by the network users. These services are offered free of charge. This means that users do not need to have prepaid airtime or a credit account in good standing in order to use the network.

The drawing shows, in a highly simplified schematic form, the architecture of a portion of a modern GSM mobile telephone network. The diagram does not purport to be comprehensive but merely illustrative. The network will typically embody intelligent network (IN) functionality.

In the illustrated network, which serves as a host network to the above mentioned virtual mobile network, a mobile telephone 10 of a caller communicates with a first base station 12 which in turn communicates with a mobile switching center (MSC) 14. The base station 12 comprises a base station controller (BSC) and a base transceiver station (BTS) with associated antenna (not shown). Associated with the mobile switching center 14 is a visited location register (VLR) 16.

A call recipient has a mobile telephone 18 which communicates with a second base station 20. The base station 20 is connected to a further mobile switching center (MSC) 22 with its own associated visited location register 24. (In some cases, the two base stations could be connected to the same MSC.) The respective mobile switching centers 14 and 22 and the respective visited location registers 16 and 24 are interconnected as shown. The visited location registers are also connected to a home location register (HLR) 26 and to a billing center 28. The MSCs 14 and 22 are also connected to the billing center. The HLR is a central database containing data relating to the account status and predetermined network settings of subscribers. The VLRs are decentralised databases which are updated with data from the HLR relating to a particular subscriber when that subscriber's telephone connects to the MSC in question.

A Short Message Service Center (SMSC) 30 is connected to the MSC 22.

Network users can be offered prepaid airtime or have credit accounts with the network operator in a conventional manner. However, it is envisaged that many or most of the network users will not be able to afford to purchase airtime in a significant value, or at all. Therefore, the network is configured to facilitate the generation of notifications to called parties, in the same network or other networks, that a call attempt from a user of the virtual network has been made, without actually connecting the call.

For example, assume first that such a user of the new virtual network wishes to talk to a person who is a subscriber of the same network. The user (the caller using the mobile telephone 10 in the drawing) dials the number of the call recipient's telephone 18. The call is routed via the base station 12 and the mobile switching center 14, which can determine from its associated visited location register 16 that the caller is a user without either prepaid airtime or a credit account in good standing. The MSC 14 modifies the call setup characteristics accordingly, and forwards the call to the MSC 22 handling the base station 20 and the call recipient's mobile telephone 18. The network allows the mobile telephone 18 to ring once and then disconnects the call without allowing it to connect (terminate) completely.

Assuming that the mobile telephone 18 of the call recipient is on and in coverage, this generates a missed call message for the call recipient, notifying the call recipient of the caller's attempt to contact him/her. The call recipient can then return the call at his/her discretion.

If the mobile telephone 18 of the call recipient is off or out of network coverage, the network generates a notification to the call recipient of the call attempt, preferably in the form of an SMS text message. The SMSC 30 generates a message which can have the following form, for example: "Please ring me on (caller's number)". Alternatively, the network can generate a synthesized voicemail message. Such a message could have the form, for example: "Please return a call received from (caller's number)."

In the case where the caller, being a user of the new virtual network, wishes to talk to a person who is a subscriber on a different network, a similar procedure is followed, but there are further implications in respect of interconnect fees payable by the network originating the call to the network on which the call is terminated. If the call recipient receives a missed call notification arising out of a "ring once and disconnect" call, or receives an SMS or voicemail message, as described above, and then returns the call to the original caller, the network of the original call recipient (who is now calling back) pays the operator of the new virtual network an interconnect fee (as determined by SATRA in South Africa) which is typically R1.23 per minute during business hours. This means that the operator of the new virtual network receives revenue from calls made to its users, while the "scotch call" made by the virtual network user does not attract the same cost levied by the other network, as the call is not terminated. (It may well be that an interconnect fee will be levied for the routing of the "scotch call", and for the sending of voicemail and SMS messages, but these fees should be less than for the termination of normal calls.)

In a development of the invention, users can be allowed to roam on other networks, including fixed line networks (particularly where the users are issued with full size SIM cards usable in public telephones). In such a case, the primary network of which the user is a subscriber and the visited network can share interconnect fees earned due to calls terminated on the visited network, in a predetermined ratio or according to a predetermined scheme. This can avoid a scenario in which other network operators are prejudiced by a one-way outflow of interconnect fees to the new network. The advantage to the users is that they can choose which network to use in given situations, based on coverage or other factors.

In combination with the method and system described in International patent application no. PCT/IB2004/000216, the contents of which are incorporated herein by reference, the method and system of the invention can allow a user of the above described new virtual network to make calls to subscribers of a network who have included the telephone number of the user in a group of designated approved callers, who can thus make automatic reverse charge calls to that subscriber. For example, in a family scenario, one or more parents might be subscribers of a first network and have prepaid airtime or a credit account with that network. The children of the family could be users of the new virtual network, with their telephone numbers being included in a group of approved reverse charge callers, so that calls made by the children to the parent(s) are connected automatically and billed to the account(s) of the parent(s).

If one of the children wishes to contact a friend, but does not have airtime to do so, the child can telephone the parent as described above, and request the parent to connect him/her to the friend. The parent may do this at his/her discretion and can then transfer the call and drop out of the conversation, using existing network functionality. In this case, both the call from the child and the call to the friend are billed to the parent's account. This arrangement gives the parent control over calls made by the child. In a variation of this arrangement, the child might be allocated a predetermined amount of airtime on a regular basis, but will have to make calls via the parent if this airtime has been used up.

It will be appreciated that variations of the above scenario can be applied to the business world, where employees wishing to make business calls can contact a designated operator at their office, who will connect them to called parties according to predetermined guidelines.

The above described method and system can be implemented using an existing intelligent mobile network, and it is envisaged that operating such a method and system would generate substantial revenue for the virtual network operator, due to the generation of a substantial volume of interconnect fees arising from calls made to users of the new network from users of other networks.

Although an example of the invention has been described in which users of the network are issued with free or low cost mobile telephones, it will be appreciated that the principles of the invention can be applied irrespective of the means of issuing a network identity to a user, whether or not the user has his/her own telephone. Thus, by merely issuing the user with a SIM card defining a network identity, the SIM card being usable in a mobile telephone, other telephone terminal, or even a public telephone, the full functionality of the invention can be provided by configuring the host network appropriately.

For example, the SIM card could be a mini SIM card of the kind used in mobile telephones, which can be provided with a holder/adapter that effectively converts the mini SIM card to a full sized (credit card sized) SIM card usable in other telephones or terminals, such as public telephones with built in smart card readers.

It is envisaged that the above described invention will enable millions of potential network users, previously excluded from access to personal telephony services, to gain useful access to such services.

The invention claimed is:

1. A method comprising:
    defining a virtual network, based on an existing telephony network, having an identity distinct from an existing network identity;
    determining whether a first user is a user of the virtual network;
    if the user is a user of the virtual network, and without charging a first user, receiving a request, originated from a first communication device operated by the first user and over the existing telephony network, for a first communication between the first communication device and a second communication device;
    if the user is a user of the virtual network, and without allowing the first communication to connect completely to the second communication device, causing a notification to be transmitted to the second communication device, wherein the notification is a missed call indicator and includes information sufficient to allow a user of the second communication device to request a second communication connection with the first communication device, and automatically disconnecting the request for the first communication; and
    allowing the user of the second communication device to request the second communication after the request for the first communication is disconnected.

2. The method of claim 1, further comprising, determining a user identifier associated with the first communication device.

3. The method of claim 2, wherein the user identifier is associated with a subscriber identity module (SIM) card.

4. The method of claim 2, wherein the user identifier is associated with a network identifier.

5. The method of claim 1, wherein the notification includes a predetermined number of rings.

6. The method of claim 1, wherein the missed call indicator is generated responsive to a single ring prior to the request for the first communication disconnecting.

7. A system comprising:
    a virtual network, based on an existing telephony network, having an identity distinct from an existing network identity,
    the system configured to:
    determine whether a first user is a user of the virtual network;
    if the user is a user of the virtual network, and without charging the first user, receive a request, originated from a first communication device operated by the first user and over the existing telephony network, for a first communication between the first communication device and a second communication device;
    if the user is a user of the virtual network, and without allowing the first communication to connect completely to the second communication device, cause a notification to be transmitted to the second communication device, wherein the notification is a missed call indicator and includes information sufficient to allow a user of the second communication device to request a second communication connection with the first communication device, and automatically disconnect the request for the first communication; and
    allow the user of the second communication device to request the second communication after the request for the first communication is disconnected.

8. The system of claim 7, further comprises determining a user identifier associated with the first communication device.

9. The system of claim 8, wherein the user identifier is associated with a subscriber identity module (SIM) card.

10. The system of claim 8, wherein the user identifier is associated with a network identifier.

11. The system of claim 7, wherein the notification includes a predetermined number of rings.

12. The system of claim 7, wherein the missed call indicator is generated responsive to a single ring prior to the request for the first communication disconnecting.

13. A method comprising:
    receiving a request for an outgoing communication originating from a first communication device operated by a first user and over a telephony network, the request being for a first communication between the first communication device and a second communication device;
    determining an identity associated with the first communication device;
    based on the identity, making a determination that the first communication device is for use on a predetermined virtual network;
    based on making the determination and without allowing the first communication to connect completely to the second communication device, causing a notification to be transmitted to the second communication device, wherein the notification is a missed call indicator and includes information sufficient to allow a user of the second communication device to request a second communication connection with the first communication device and wherein causing the notification to be transmitted to the second communication device includes causing the notification to be transmitted without charging the first user; and based on making the determination, automatically disconnecting the request for the first communication.

14. The method of claim 13, wherein the identity is associated with a subscriber identity module (SIM) card.

15. The method of claim 13, wherein the identity is associated with a network identifier.

16. The method of claim 15, wherein the network identifier is a mobile telephone number.

17. The method of claim 13, wherein automatically disconnecting includes automatically disconnecting after a predetermined number of rings.

* * * * *